Sept. 24, 1963
A. J. ZUERCHER
3,104,755
DEFLECTOR DEVICE FOR CONVEYORS AND THE LIKE
Filed June 27, 1960
4 Sheets—Sheet 1
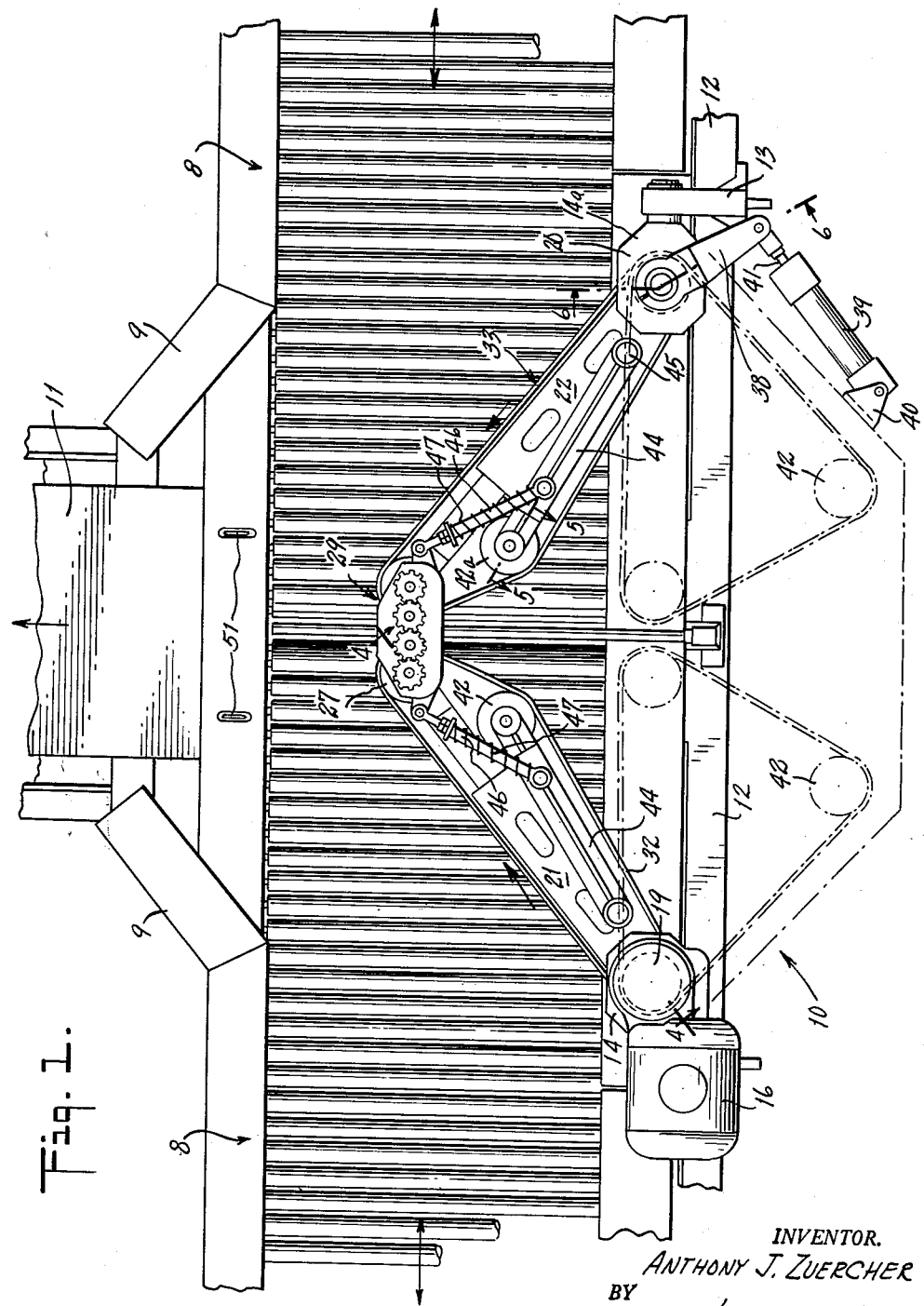
Fig. 1.
INVENTOR.
ANTHONY J. ZUERCHER
BY
ATTORNEYS Sept. 24, 1963     A. J. ZUERCHER     3,104,755
DEFLECTOR DEVICE FOR CONVEYORS AND THE LIKE
Filed June 27, 1960     4 Sheets-Sheet 2
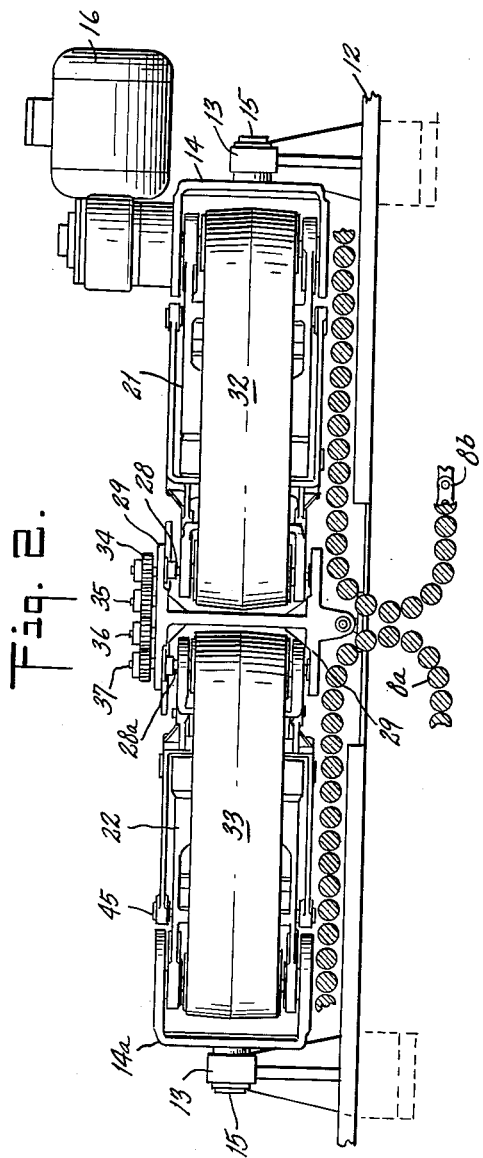
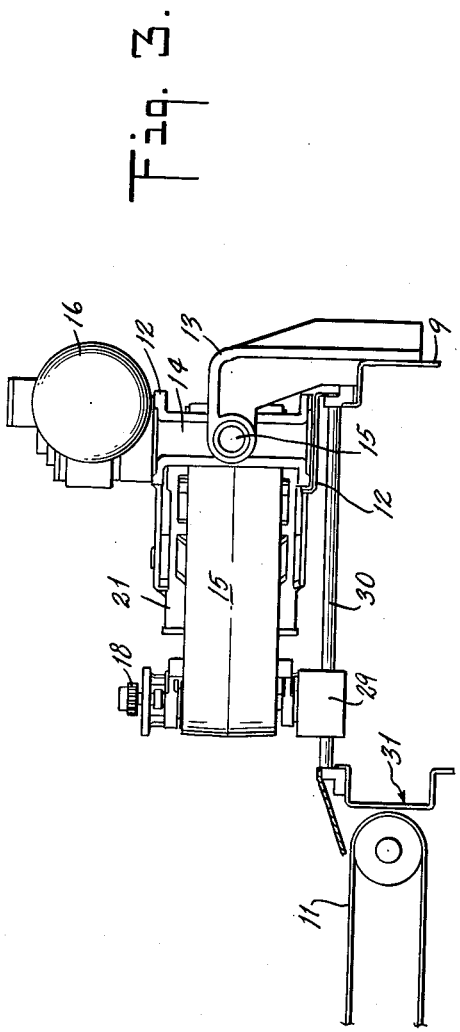
INVENTOR.
ANTHONY J. ZUERCHER
BY
ATTORNEYS Sept. 24, 1963     A. J. ZUERCHER     3,104,755
DEFLECTOR DEVICE FOR CONVEYORS AND THE LIKE
Filed June 27, 1960     4 Sheets-Sheet 3
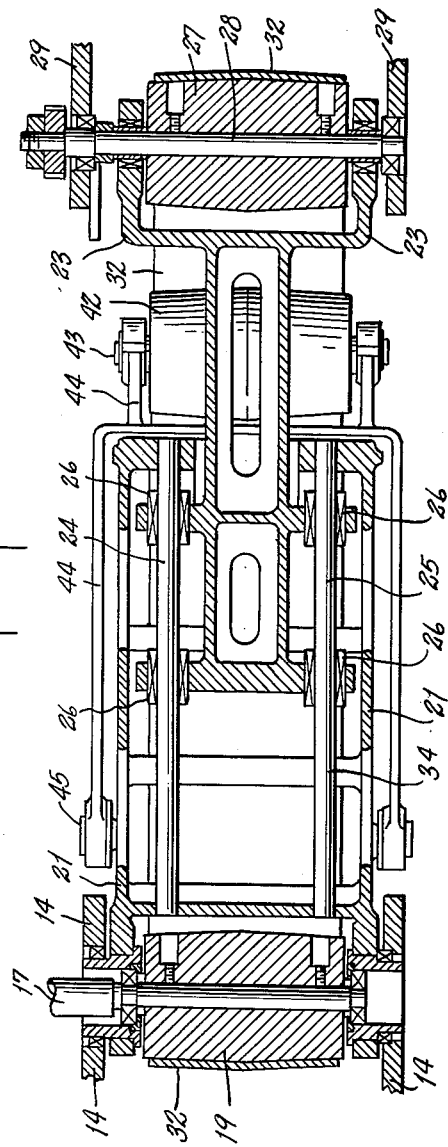
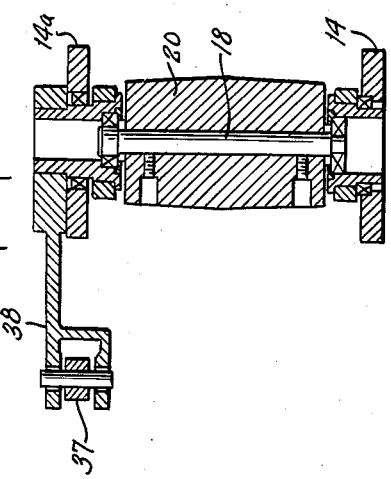
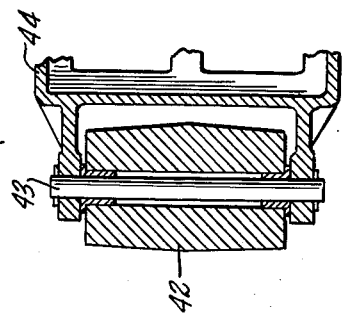
INVENTOR.
ANTHONY J. ZUERCHER
BY
ATTORNEYS Sept. 24, 1963 A. J. ZUERCHER 3,104,755
DEFLECTOR DEVICE FOR CONVEYORS AND THE LIKE
Filed June 27, 1960 4 Sheets-Sheet 4

INVENTOR.
ANTHONY J. ZUERCHER
BY
Kenyon & Kenyon
ATTORNEYS

United States Patent Office 3,104,755
Patented Sept. 24, 1963

3,104,755
DEFLECTOR DEVICE FOR CONVEYORS
AND THE LIKE
Anthony J. Zuercher, Easton, Pa., assignor to T. W. &
C. B. Sheridan Co., New York, N.Y., a corporation of
New York
Filed June 27, 1960, Ser. No. 39,055
12 Claims. (Cl. 198—185)

This invention relates to deflector means and more particularly to deflector means for a conveyor system for deflecting the flow of bundles or packages from a conveyor to an outlet at an angle to the direction of flow.

The device of this invention will be described in terms of its use in an automated mail room system for a newspaper. The system, and the use of the deflector device of this invention therein, is described and illustrated in my copending application Ser. No. 41,189. However, it should be appreciated that the deflector device of this invention may be used in any other kind of system where it is desirable to provide means for deflecting the flow on a conveyor to an outlet at an angle to the direction of flow on the conveyor.

One of the problems associated with a system such as is described in my copending application Ser. No. 41,189 is to provide means by which an accurate count of newspaper bundles delivered to an outlet may be obtained. Such a count is necessary since, in order for the system to operate properly and automatically, the operator and the control console must have an accurate indication of the exact number of units delivered at a particular loading station.

Accordingly it is an object of this invention to provide deflector means for routing the flow of bundles on a conveyor to a location off of the conveyor and for providing a means by which an accurate count of the bundles deflected may be made.

Another object is to provide a deflector device which may be retracted and extended to permit flow past the loading station or deflect the flow to the loading station as desired.

A further object is to provide a deflector which may operate to deflect the flow of two conveyors whose junction point is at the center of the deflector and both of which may be delivering bundles or packages to the deflector which automatically routes the flow away from both conveyors and makes possible the accurate counting of bundles from each conveyor to provide a total count of bundles deflected.

In brief, the operation of the device of this invention is as follows: In the dispatch conveyor system described in my copending application Ser. No. 41,189 the dispatch conveyor is made up of a number of separate conveyor tables which are bi-directional in operation. The juncture point at which two of the tables come together is conveniently a loading station. This permits both conveyor tables to be operated to route the flow toward the center of the loading station. Hence the loading station may be serviced from more than one input or feeder line to the dispatch conveyor.

The system described in the application just referred to is one which automatically orients the direction of operation of the conveyor tables to route the flow to a selected loading station. At each loading station there is provided the deflector device of this invention. The deflector operates in such a manner as to route the flow of bundles from both conveyor tables onto a loading platform or the telescoping delivery table described in my copending application Ser. No. 39,054. In addition, the deflector device separates the incoming bundles in such a manner as to make possible an accurate count of the bundles leaving the dispatch conveyor and being delivered to the loading station.

The deflector device is capable of automatic operation to extend when a particular loading station is selected by the operator or control console and to retract automatically when the required number of bundles has been directed into the particular loading station. Thus the deflector device of this invention provides a highly efficient and inexpensive means of delivering the flow of two separate incoming conveyors to one loading station in such a manner as to provide for accurate counting.

Other objects and features of this invention will become more apparent in the description which follows when taken in connection with the accompanying drawings in which:

FIG. 1 is a plan view of a portion of a dispatch conveyor and loading station including the deflector of this invention;

FIG. 2 is a front end view of the device illustrated in FIG. 1;

FIG. 3 is a side view;

FIG. 4 is a cross sectional view taken on the line 4—4 of FIG. 1;

FIG. 5 is a cross sectional view taken on the line 5—5 of FIG. 1;

FIG. 6 is a cross sectional view taken on the line 6—6 of FIG. 1; and

Figure 7:
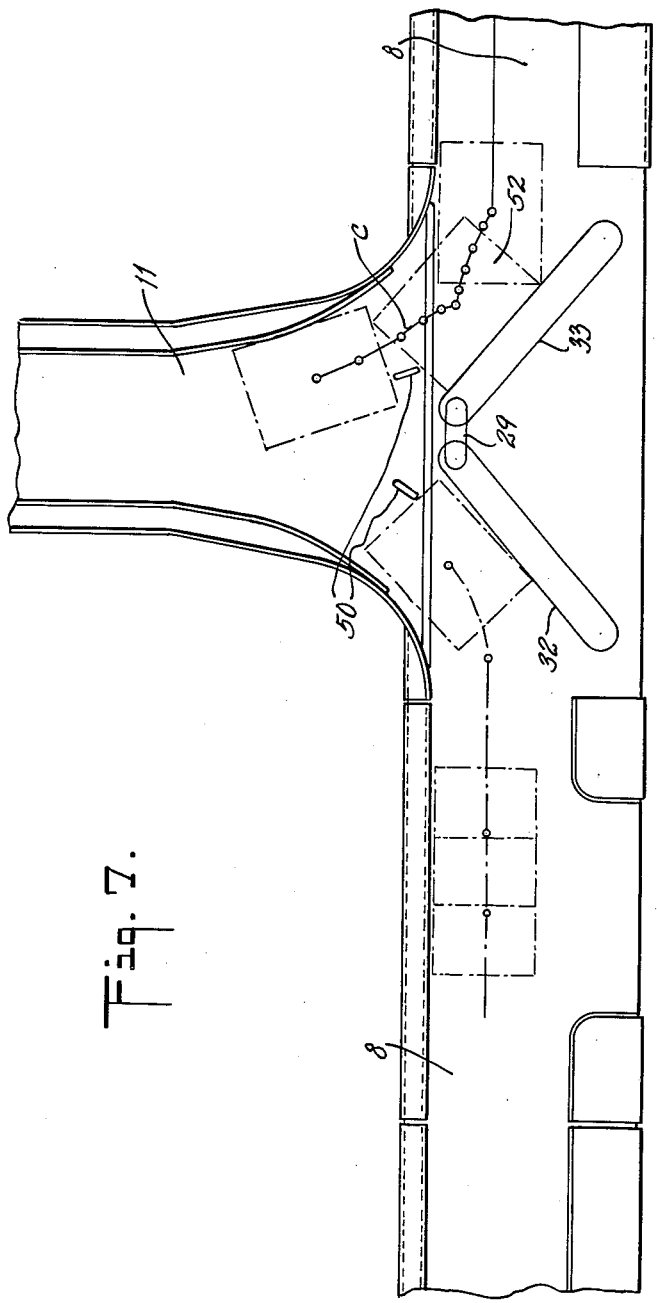
FIG. 7 is a schematic flow diagram illustrating the operation of the device of this invention.

Referring now to FIG. 1 in which the loading station portion of a dispatch conveyor is illustrated. Generally the conveyor is one which may be operated in either direction so that bundles may be carried to the loading station from either or both directions simultaneously.

The deflector device 10 is positioned so as to interrupt the flow on the conveyor when extended and is adapted to be retracted so that flow of bundles may proceed past the loading station. In normal operation a housing (the rear portion of which is indicated by dotted lines in FIG. 1) will cover the working portions of the deflector 10. The deflector device 10 in its extended position is as indicated in FIG. 1 in solid lines. When retracted the outline of the deflector device 10 is as shown in dotted lines in FIG. 1.

The dispatch conveyor may be conveniently made up of two dispatch conveyor tables 8 of the type described and illustrated in my copending application Ser. No. 41,200, now abandoned. In general the conveyor tables 8 are made up of a frame which carries endless chains on shafts driven through a gearing arrangement with a motor for each conveyor table. Rotatable rollers are carried on the chains and travel with them. The motors drive the chains in either direction so that the tables are bi-directional in operation. The operation of the conveyor tables 8 may be controlled by an operator or may be under the control of a console which automatically orients on conveyor tables 8 to operate so that a flow of bundles on the dispatch conveyor will be directed to a single loading station. In order to direct the flow to a single loading station the conveyor tables 8 meet at the center line of the loading station.

Each of the tables 8 has a side plate 9 which is placed at an angle corresponding to the angle between the deflector device 10 when extended and the longitudinal axis of the dispatch conveyor. The loading station is of sufficient width so as to permit bundles being fed from both conveyor tables 8 to be diverted onto the loading platform 11. A frame member 12 connects the conveyor tables 8.

The deflector mechanism 10 is attached to the conveyor tables 8 on frame member 12 by means of deflector mounting brackets 13. Deflector mounting brackets 13 are rigidly attached to the frame 12 and carry spindle housings 14 and 14a. The spindle housings 14 and 14a have shaft portions 15 which are mounted for slight rotational movement in the brackets 13.

Spindles 17, 18 are journalled in the spindle housings 14, 14a respectively. The drive motor and reducing gears 16 are carried on spindle housings 14. Spindle 17 is connected to the drive motor and reducing gear 16. Belt drive pulley 19 is rigidly attached to spindle 17 as shown in FIG. 4. Belt pulley 20 is in turn rigidly attached to spindle 18 as shown in FIG. 6.

Swinging arms 21, 22 are journalled on spindles 17, 18 respectively and are free to rotate about spindles 17, 18. Telescoping arms 23 are carried within hollow portions of swinging arms 21, 22 which include guide rods 24, 25. Bearing surfaces 26 which are portions of the swinging arms 21, 22 are mounted on rods 24, 25 and serve to guide the telescoping arms 23 in their outward and inward movement. Each of the telescoping arms 23 carry belt pulleys 27, 27a which are rigidly attached to shafts 28. The shafts 28 are journalled in the outer ends of telescoping arms 23.

A center bracket 29 connects the two shafts 28. A guide rod 30 supported on one end by the frame 12 and a portion of the frame 31 serves to support the center portions of the deflector 10 and to guide its inward and outward movement.

Belts 32, 33 are positioned around pulleys 19, 42, 27 and 20, 42a 27a respectively. A gear 34 is rigidly attached to shaft 28 and is hence driven by the rotation of pulley 27 by belt 32 which is driven by pulley 19 attached to the drive spindle 17. Idler gears 35, 36 transfer the rotation to a driven gear 37 which is in turn attached to the shaft 28a on which pulley 27a is mounted. Thus the drive motor and reducing gears 16 operate to drive both belts 32, 33 toward or away from the center of the loading station depending upon the direction of rotation of spindle 17 by the drive motor and reducing gear 16. In normal operation the direction of movement of the belts 32, 33 will be toward the center of the loading station.

An actuating arm 38 is bearinged on spindle housing 14a and rigidly attached to the trunnion of arm 22. A pneumatic cylinder 39 is pivotally attached to a bracket 40, in turn carried on the deflector housing (shown in dotted lines in FIG. 1). The connecting rod 41 of the pneumatic cylinder 39 is pivotally attached to the actuating arm 38. When the connecting arm 41 is withdrawn inside the pneumatic cylinder 39 as shown in FIG. 1 the deflector device 10 will be in the extended position illustrated in solid lines of FIG. 1. In the extended condition, the telescoping arms 23 have moved downward on rods 24, 25 by virtue of their being connected together on center support 29, as the actuating arm 38 is rotated counter clockwise. Thus the movement of the center bracket 29 along guide bar 30 forces telescoping arms 23 gradually downward until they reach their extended position at the end of the actuating arm 38. When connecting rod 41 is forced out of pneumatic cylinder 39 it causes the counter clockwise rotation of actuating arm 38 about its pivot thus causing the inward movement of telescoping arms 23.

The pneumatic cylinder 39 is preferably operated by a double acting solenoid valve (not shown) of the usual type which is under the control of either an operator or centrally located control console described in my copending application Ser. No. 41,189. The solenoid valve is of the type which supplies air to the blank end of the pneumatic cylinder 39 and at the same time exhausts the air from the rod end to cause the connecting rod 41 to rotate the actuating arm 38 in a counter clockwise direction and thus retract deflector device 10. When the deflector device 10 is extended air is supplied to the rod end of pneumatic cylinder 39 and air is exhausted from the blank end thus causing the rotation of the actuating arm clockwise. It is often desirable to provide a control switch at the solenoid valve adjacent each deflector device 10 so that each may be operated independently of the system should the need arise therefor. In the automated system described in my copending application Ser. No. 41,189 the extension or retraction of each deflector device 10, where a plurality of loading stations are involved, is operated by the control console automatically to cycle the delivery of bundles to the loading stations in a preferred sequence.

In order to take into account inward and outward movement of the telescoping arms 23 and thus the location of the distances between the pivot point of the swinging arms 21, 22 and the pulleys mounted at the outer end of each telescoping arm 23, it is necessary to provide take-up pulleys 42, 42a. Takeup pulleys 42, 42a are affixed to shafts 43 which are in turn journalled on the outer end of take up arms 44. Takeup arms 44 are pivotally mounted on swinging arms 21, 22, as shown, by means of takeup arm mounting stud 45. Telescoping spring rod assemblies 46 are pivotally connected to each takeup arm 44 on one end and a portion of the center support 29 on the other. A spring 47 forces the telescoping rod away from the end of the assembly 46 and hence acts to force the takeup pulleys 42, 42a to take up any slack in the belts 32, 33. As the supporting arms 21, 22 are rotated counterclockwise the telescoping arms 23 will move inwardly causing the takeup arms 44 with their takeup pulleys 42, 42a to be forced outwardly and take up the slack in the belts 32, 33 resulting from the inward movement of telescoping arms 23. This insures that there will be no slack in belts 32, 33 at any time and that the belts remain firmly in contact with all of their respective pulleys.

The operation of the deflector device of this invention to deflect bundles onto a loading station is illustrated schematically in FIG. 7. A line C indicates the movement of the center of a bundle 52 as it travels along dispatch conveyor 8. As acted upon by the belt 33, the bundle 52 is rotated to create a gap 54 and eventually is carried away from the device by either a loading conveyor or the action of gravity down a chute. For example, when it is desirable to deflect bundles on the dispatch conveyor 8 to a loading station which is approximately at right angles to the dispatch conveyor it is desirable to have the outer surface of the belts 32, 33 make a 35° angle with the longitudinal axis of the dispatch conveyor. In order to effect the rotation of the bundles by the operation of the combined dispatch conveyor and the moving belts 32, 33 it is desirable to have the belts have a linear speed which is in excess of the linear speed of the bundles moving along the dispatch conveyor 8. In order to arrive at a minimum linear speed of the belts 32, 33 it is desirable to have the linear speed be at least an amount which is equal to or greater than the linear speed of the dispatch conveyor times the secant of the angle between the longitudinal axis of the belts, dispatch conveyor 8 and the direction of movement of the belts 32, 33. In this particular circumstance since the angle between the longitudinal axis and the direction of movement of the belts 32, 33 is 35° the linear speed of the belt should be equal to the linear speed of the bundles on the conveyor 8 times the secant of 35°. Under these conditions there will be imparted to the bundles a resultant motion as shown schematically in FIG. 7. It is important that there be created between each of the bundles a gap which is of sufficient size to permit the accurate counting of the bundles as they pass from the dispatch conveyor 8 to the loading station 11. As may be clearly seen in FIG. 7 the device of this invention creates that gap.

The gap between the bundles permits the use of simple trip switches 50 mounted as shown in FIGS. 1 and 7 at the exit of the dispatch conveyor 8 to the loading platform 11. The trip switch fingers 51 will be depressed by the leading edge of each bundle as it passes thereover. The fingers 51 will remain depressed so long as the bundle is being conveyed over the location of the trip switches 50. As soon as the trailing edge of the bundle passes over the trip switch 50 the finger will rise and one count will be registered. The next bundle repeats the cycle. It will be appreciated that the creation of a gap between succeeding bundles permits the use of almost any kind of counting device. For example photo-electric cells located beneath and above the area at the exit of the dispatch conveyor, pneumatic and mechanical counters of any known type may be employed. The trip switches 50 have been illustrated as one particular type of counting means which is simple and reliable.

The use of powered belts 32, 33 on the deflector device 10 as illustrated and described herein has many advantages over other types of deflector systems which rely on the momentum created by the conveyor to force bundles away from the conveyor to an outlet. It will be appreciated that though the deflector device 10 of this invention is described as one which can route the flow of two incoming conveyors to a single loading station the device is also useful where a single bi-directional conveyor is used since it can be permanently installed and can route the flow to a loading station regardless of the direction from which the flow is coming.

In the particular kind of dispatch conveyor 8 employed herein the operation of the rollers 8a is such that the rollers can rotate freely when a bundle carried by the conveyor 8 is held against traveling. Thus the conveyor's chains 8b continue to travel while the rollers 8a revolve in a direction opposite to the direction of movement of the conveyor's chains 8b resulting in a situation where no movement of the bundle is effected. Correspondingly a bundle can be constrained on the conveyor 8 so as to slow its travel in relation to the movement of the conveyor chains 8b. This conveying action creates an effect such that the bundle is floating somewhat like a boat along a moving stream of water because of the free rotation of the rollers 8a.

As shown in FIG. 7 when a bundle encounters one of the belts 32, 33 the reaction is similar to the bundle having come in contact with a vertical wall moving transversely at an obtuse angle with respect to the traveling direction of the bundle. The bundle's forward corner most adjacent to this moving wall is nudged or deflected by the moving wall in the direction of the wall's angularity while the bundle's rear portion continues to receive the forward urge of the conveyor 8. In view of the fact that the linear speed imparted to the front corner of the bundle is greater than the linear speed of the rear part of the bundle the effect is to rotate the bundle. Finally by the combined action of the moving vertical wall created by the belts 32, 33 and the conveyor 8 the bundle is forced to travel in its new direction substantially at right angles to its former direction because each bundle is rotatably turned in succession, the corners of adjacent bundles separate on the sides of the bundles which are towards the moving wall formed by the belts 32, 33, thus giving the opportunity to count the bundles as they pass from the dispatch conveyor 8 to the loading platform 11. This of course permits the counting operation described above which in the particular case illustrated is effected by trip switches 50, positioned at an angle to the longitudinal axis of the dispatch conveyor 8 and located so as to be at that point in the path of the bundles as to take the maximum advantage of the gap created by the deflector device 10 of this invention. As has been stated above it is important that the combined effect of the conveyor 8 and the deflector device 10 of this invention create a gap between adjacent bundles. This is important where it is desirable to have a means for registering an accurate count of the number of bundles or packages passing from dispatch conveyor to loading station. Thus in the automated system described in my copending application Ser. No. 41,189 such a count forms the basis by which the automatic programming operation is effected.

When the forward part of a bundle reaches the loading platform 11 which may be a conveyor belt a pull is exerted on the bundle in the new direction of movement of the loading platform conveyor belt which is at an angle to the direction of the travel of the dispatch conveyor 8. During this time the conveyor rollers 8a are free to rotate while traveling under the rear part of the bundle the moving wall or belts 32, 33 are shown as being vertical or normal to the dispatch conveyor 8, but it will be appreciated that the action of deflecting or guiding the bundles only requires that there be an application of the required amount of force in the desired direction. In certain instances it is desirable to provide for a loading platform 11, which is some distance from the dispatch conveyor 8. For example a chute may be used between the dispatch conveyor 8 and a loading platform 11 or loading conveyor belt. In this circumstance the outlet of the dispatch conveyor 8 would decline at an angle sufficient so that gravity could cover the bundles from their deflected location down the chute or the like.

The above is a description of a preferred embodiment of this invention. It will be appreciated by those skilled in the art that there are changes which can be made which do not depart from the spirit of this invention or the scope of the appended claims.

The invention is particularly useful in connection with traveling newspapers tied up in the normal bundles. Here the edges of the newspapers cannot be subjected to severe guiding stresses because they would be damaged too badly. Further, speed demands that the bundles travel over the conveyors 8 so closely together that there is no space between them. Thus is presented the dual problem of switching the bundles without damage from the conveyors 8 as required for their delivery to any of a number of chutes leading to the usual newspaper delivery truck loading bags, and of counting the bundles so delivered by this switching, in each instance.

Plainly the present invention solves both problems. The gentle switching or transverse guiding prevents damage to the newspapers comprising each bundle. No bundle can press against the moving belts more strongly than is required to make the conveyor rollers roll, and these may be journaled for very friction-free rotation. Further, as the flow of bundles is turned, each bundle forms a space on the outer side of the turn between that bundle and the following bundle, thus giving opportunity for the actuation of the trip switch 50 working at that turn.

I claim:

1. A material handling system including a conveyor means for routing the flow of material away from said conveyor including retractable and extendible deflector means comprising a frame, rotatable arm means carried on pivot means mounted on said frame, pulley means journalled on said pivot means and journalled on shaft means at the end of said arm means opposite said pivot means, belt means carried on said pulley means, driving means for said belt means, and means for rotating said arm means to retract and extend said arm means to permit flow along said conveyor when said arms are retracted and deflect material away from said conveyor when extended, said rotatable arm means comprising a support portion carried on said pivot means and a telescoping portion carried by said support portion and mounted for limited movement toward and away from said pivot means, said shaft means being journalled in said telescoping portion at the end thereof opposite said pivot means, said telescoping portion extending away from pivot means when said arm means are extended and at least partially withdrawn into said support portion when said arm means is retracted.

2. A material handling system including a conveyor means for routing the flow of material away from said conveyor including retractable and extendible deflector means comprising a frame, rotatable arm means carried on pivot means mounted on said frame, pulley means journalled on said pivot means and journalled on shaft means at the end of said arm means opposite said pivot means, belt means carried on said pulley means, driving means for said belt means, and means for rotating said arm means to retract and extend arm means to permit flow along said conveyor when said arms are retracted and deflect material away from said conveyor when extended, said rotatable arm means comprising a support portion carried on said pivot means and a telescoping portion carried by said support portion and mounted for limited movement toward and away from said pivot means, said shaft means being journalled in said telescoping portion at the end thereof opposite said pivot means, said telescoping portion extending away from pivot means when said arm means are extended and at least partially withdrawn into said support portion when said arm means is retracted, take-up pulley and arm means rotatably mounted on said supporting portion of said arm means, means for rotating said take-up arm means to take up the slack in said belt means when said telescoping portion of said arm means moves toward said pivot means.

3. A material handling system including a conveyor means for routing the flow of material away from said conveyor including retractable and extendible deflector means comprising a frame, rotatable arm means carried on pivot means mounted on said frame, pulley means journalled on said pivot means and journalled on shaft means at the end of said arm means opposite said pivot means, belt means carried on said pulley means, driving means for said belt means, and means for rotating said arm means to retract and extend asid arm means to permit flow along said conveyor when said arms are retracted and deflect material away from said conveyor when extended, said arm means comprising two separate arm portions pivotally carried on said frame means, center support means connecting the ends of said arms opposite said pivot means, each of said arm means having a support portion carried on said pivot means and a telescoping portion slidably movable toward and away from said pivot means and interconnected by said center support means.

4. A material handling system including a conveyor means for routing the flow of material away from said conveyor including retractable and extendible deflector means comprising a frame, rotatable arm means carried on pivot means mounted on said frame, pulley means journalled on said pivot means and journalled on shaft means at the end of said arm means opposite said pivot means, belt means carried on said pulley means, driving means for said belt means, and means for rotating said arm means to retract and extend said arm means to permit flow along said conveyor when said arms are retracted and deflect material away from said conveyor when extended, said arm means comprising two separate arm portions pivotally carried on said frame means, center support means connecting the ends of said arms opposite said pivot means, each of said arm means having a support portion carried on said pivot means and a telescoping portion carried by said support portion and slidably movable toward and away from said pivot means therein, said center support means interconnecting said telescoping portions, take-up arm and pulley means rotatably carried on the support portion of each of said arm means and means for rotating said take-up arm means when telescoping portion moves toward said pivot means to take up the slack in said belt means.

5. A material handling system including a conveyor means for routing the flow of material away from said conveyor including retractable and extendible deflector means comprising a frame, rotatable arm means carried on pivot means mounted on said frame, pulley means journalled on said pivot means and journalled on shaft means at the end of said arm means opposite said pivot means, belt means carried on said pulley means, driving means for said belt means, and means for rotating said arm means to retract and extend said arm means to permit flow along said conveyor when said arms are retracted and deflect material away from said conveyor when extended, said arm means comprising two separate arm portions pivotally carried on said frame means, center support means connecting the ends of said arms opposite said pivot means, each of said arm means having a support portion carried on said pivot means and a telescoping portion carried by said support portion and slidably movable toward and away from said pivot means and said center support means interconnecting said telescoping portions, separate take-up arm and pulley means rotatably carried on the support portion of each of said arm means and means for rotating said take-up arm means when said telescoping portion moves toward said pivot means to take up the slack in said belt means, said driving means having a connection to one of said pulley means carried on one of said pivot means and said means for rotating said arm means being connected to said support portion of the other of said arm means.

6. A material handling system including a conveyor, means for routing the flow of material on said conveyor away from said conveyor to a loading station including retractable and extendible deflector means comprising a frame, separate rotatable arm means carried on pivot means, said pivot means being carried on said frame, pulley means journalled on said pivot means and journalled on shaft means at the end of each of said arm means opposite said pivot means, belt means carried on said pulley means, driving means connected to one of said pulley means, means connecting said separate arm means for supporting the outer ends of said arm means, means for transferring the rotation of the driven pulley means to the other belt carried on said other arm means, guiding means attached to said frame for supporting and guiding said arm connecting means, said arm means including a support portion rotatably mounted on said pivot means and a telescoping portion carried by said support portion and movable toward and away from said pivot means, said connecting means interconnecting said telescoping portions, and means for rotating said arm means to extend said arm means to deflect material onto said loading station and to retract said arm means to permit flow on said conveyor past said loading platform.

7. A conveyor system having a plurality of separate bi-directional conveyor tables positioned in an end to end relationship with each other, a loading station positioned on one side of the meeting point of two of said conveyor tables, retractable and extendible deflector means for routing the flow of material away from said conveyor tables positioned at the side of said conveyor tables opposite said loading station, said deflector means comprising rotatable arm means pivotally carried to the frames of said separate conveyor tables, pulley means journalled on said pivot means and journalled on shaft means at the end of said arm means opposite said pivot means, belt means carried on said pulley means, driving means for said belt means and means for rotating said arm means to retract and extend said deflector means to permit flow along said conveyor system when said arm means is retracted and to deflect material to said loading station when said arm means is extended, said arm means comprising a support portion carried on said pivot means and a telescoping portion carried by said support portion and mounted thereon for limited movement toward and away from said pivot means, said shaft means being journalled in said telescoping portion at the end thereof opposite said pivot means, said telescoping portion extending away from said pivot means when said arm means is extended and at least partially withdrawn into said support portion when said arm means is retracted.

8. A conveyor system having a plurality of separate bi-directional conveyor tables positioned in an end to end relationship with each other, a loading station positioned on one side of the meeting point of two of said conveyor tables, retractable and extendible deflector means for routing the flow of material away from said conveyor tables positioned at the side of said conveyor tables opposite said loading station, said deflector means comprising rotatable arm means pivotally carried on the frames of said separate conveyor tables, pulley means journalled on said pivot means and journalled on shaft means at the end of said arm means opposite said pivot means, belt means carried on said pulley means, driving means for said belt means and means for rotating said arm means to retract and extend said deflector means to permit flow along said conveyor system when said arm means is retracted and to deflect material on to said loading station when said arm means is extended, said rotatable arm means comprising two separate arms each of said arms having a support portion carried on said pivot means and a telescoping portion carried by said support portion and mounted for limited movement toward and away from said pivot means, said shaft means being journalled in said telescoping portion at the end thereof opposite said pivot means, center support means interconnecting the shaft means for each of said telescoping portions for supporting and guiding said telescoping portions, said telescoping portions extending away from said pivot means when said arm means are extended over said conveyor and at least partially withdrawn into said support portion when said arm means is retracted.

9. A conveyor system comprising a plurality of separate bi-directional conveyor tables, each of said conveyor tables being positioned to carry the flow of material along said system, a loading station adjacent each meeting point of two of said conveyor tables to one side of said meeting point and deflector means positioned on the side of said table opposite said loading station, said deflector means comprising two arm members pivotally mounted on pivot means attached to the frames of said tables, each of said arm members including a support portion carried on said pivot means and a telescoping portion carried by said support portion and mounted for limited movement toward and away from said pivot means, pulley means journalled on said pivot means and pulley means journalled in the end of said telescoping portion opposite said pivot means, belt means carried on said pulley means, center support means interconnecting said telescoping portions, guide means positioned at the center line of said loading station carried by said frame for supporting and guiding said center supporting means, means for driving said belt means in a direction toward the center of said loading station, and means for extending or retracting said arm members to permit the flow of material on said conveyor system past said deflector means when said arm means is retracted and to deflect material on to said loading station when said arm means is extended.

10. A conveyor system having a plurality of separate bi-directional conveyors positioned end to end with respect to each other, a loading station positioned on one side of the junction of two of said conveyors, retractable and extendible deflector means carried on the frame of said conveyors on the side of said conveyors opposite said loading station for simultaneously routing the flow of material away from each of said conveyors, said deflector means comprising pivotal arms carried on pivot means mounted on the frame of each of said conveyors, pulley means journalled on said pivot means and journalled on shaft means at the end of said arm means opposite said pivot means, belt means carried on said pulley means, driving means for said belt means and means for pivoting said arm means to retract and extend said deflector means to permit flow along said conveyors when said arm means is retracted and to deflect material from both of said conveyors simultaneously to said loading station when said arm means is extended.

11. A conveyor system for packaged material, including conveyor means, means for deflecting said material on said conveyor means to a location off said conveyor means and for providing a count of the number of packages deflected from said conveyor means comprising retractable and extendible deflector means positioned above said conveyor means having moving belt means positioned to form a moving wall means, said wall means moving in a direction at an obtuse angle with respect to the direction of movement of packages on said conveyor means, said moving wall having a linear speed which is in excess of the speed of said packages on said conveyor means whereby said moving wall effects a rotational movement of each of said packages and creates a gap between the trailing edge of each package and the leading edge of the following package, and package actuated counting means positioned adjacent said conveyor means and deflector means at the location on said conveyor means where said gap occurs, said counting means being activated when a bundle passes thereover and to be deactivated when said gap between said packages occurs, said conveyor means comprising two separate bi-directionally operating conveyors positioned in end-to-end relation and said deflector means positioned at the juncture of said conveyors.

12. A conveyor system for packaged material, including conveyor means, means for deflecting said material on said conveyor means to a location off said conveyor means and for providing a count of the number of packages deflected from said conveyor means comprising retractable and extendible deflector means positioned above said conveyor means having moving belt means positioned to form a moving wall means, said wall means moving in a direction at an obtuse angle with respect to the direction of movement of packages on said conveyor means, said moving wall having a linear speed which is in excess of the speed of said packages on said conveyor means whereby said moving wall effects a rotational movement of each of said packages and creates a gap between the trailing edge of each package and the leading edge of the following package, and package actuated counting means positioned adjacent said conveyor means and deflector means at the location on said conveyor means where said gap occurs, said counting means being activated when a bundle passes thereover and to be deactivated when said gap between said packages occurs, said conveyor means comprising two separate bi-directionally operating conveyors positioned in end-to-end relation and said deflector means positioned at the juncture of said conveyors, separate counting means being provided on each of said conveyors whereby packages carried by each and deflected by said deflector means will be separately counted.

References Cited in the file of this patent
UNITED STATES PATENTS

| | | |
|---|---|---|
| 1,319,190 | Van Houten | Oct. 21, 1919 |
| 1,729,671 | Bell-Irving et al. | Oct. 1, 1929 |
| 1,822,930 | Keller | Sept. 15, 1931 |
| 1,881,897 | Olson | Oct. 11, 1932 |
| 1,959,238 | Horsfield | May 15, 1934 |
| 2,156,105 | Bergmann | Apr. 25, 1939 |
| 2,342,471 | Jampol | Feb. 22, 1944 |
| 2,575,847 | Skillman | Nov. 20, 1951 |
| 2,649,187 | Eggleston | Aug. 18, 1953 |
| 2,769,530 | Powers | Nov. 6, 1956 |